Dec. 11, 1928.
G. FORNACA
VALVE GEAR
Filed Dec. 22, 1927
1,695,011
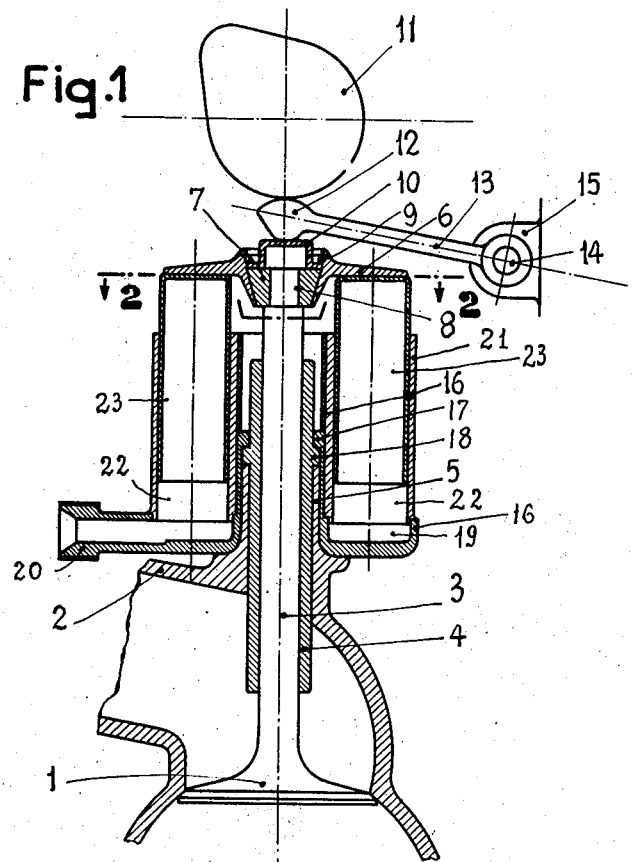
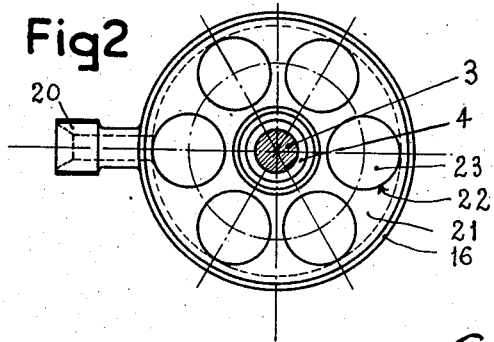
Inventor:
Guido Fornaca
By
Attorney Patented Dec. 11, 1928.

1,695,011

UNITED STATES PATENT OFFICE.

GUIDO FORNACA, OF TURIN, ITALY.

VALVE GEAR.

Application filed December 22, 1927, Serial No. 241,922, and in Italy December 31, 1926.

This invention relates to internal combustion engines, and has for its object an improved valve gear of the kind in which a fluid under pressure is used instead of spring members to return the valve to closed position with its end or cam-actuated part in contact with the top portion of the cam actuating it.

The invention further comprises a construction of the above stated kind, in which the valve gear comprises a series of plunger bores having means for the supply of fluid under pressure thereto, and a series of plungers each reciprocating in one of said bores and acting to hold the valve in closed position.

According to a further feature of the invention, the valve gear comprises a member or body wherein said bores are provided, a common main chamber leading to said bores for supplying pressure fluid thereto, and a series of plungers each in one of said bores, the pressure fluid acting to force said body against a stationary part of the engine and said plungers against a part solid with the valve stem.

As a still further feature of this invention, said member has a central passage by means of which it is located on and around the valve-stem guide member to provide for the arrangement of said bores and respective plungers around the valve stem.

In the annexed drawing is illustrated by way of example an embodiment of the invention, Figure 1 thereof being a central section through the valve axis of the valve gear, and Figure 2 being a horizontal section of the gear on line 2—2 of Figure 1.

As shown in the drawing, the gear comprises a valve 1 controlling the passage of a duct 2 and having its stem 3 reciprocating in a guide sleeve 4 fastened in a perforated boss 5 formed on the wall of duct 2; the top end of the valve stem having secured thereon a disk 6 which has a tapering bore embracing tapering sleeve sections 7 which engage a groove 8 of the valve stem 3. An expansible ring 9 acts to prevent said disk from releasing said tapering sleeve sections 7, and a cap 10 is located on the end of the valve stem.

The valve control is made by a cam 11 and a tappet 12 carried by an arm 13 pivoted at 14 in a stationary part 15 of the engine; these parts are shown diagrammatically on the drawing as they are known.

On the guide sleeve 4 and on boss 5 of the duct 2 in which said guide is inserted, is located a tubular member 16 having an internal shoulder or abutment 17 intended to engage an external abutment or shoulder 18 on the guide.

Said member provides a bottom chamber 19 having a connection 20 for the supply of a pressure fluid, and a cylindrical part 21 is fastened on said tubular member. Cylinder 21 has a row of bores 22 having their axes parallel with the valve axis and lying in a circular row or series concentric with the valve axis. Each of said bores is open at its top and at its bottom leads to said chamber 19.

In each bore 22 is mounted to reciprocate a plunger 23 which, as illustrated, is hollow and in the shape of a shell or cartridge case and abuts at its upper end against the disk 6 connected with the valve stem, as above described.

In operation, a pressure fluid, such as compressed air, fed by a compressor (not shown) driven by the engine or obtained from any other source, is supplied to connection 20 and chamber 19 and acts in chamber 19, bores 22 and hollow plungers 23 to force said plungers upward against disk 6. As the latter is secured to the valve stem 3, the valve will be moved upward with it into closed position, and at the same time the air pressure also acts on the bottom of chamber 19 and holds down parts 16—21 with abutment 17 engaged on the abutment 18 of guide 4.

The source of compressed air serves to keep substantially constant the pressure which it exerts on the pistons to maintain the valve closed; and, in consequence, losses must be compensated for, and the pressure must not exceed a predetermined limit. Accordingly, there are intercalated in the usual manner in the piping connecting the air source and the nipple 20 a chamber and a safety valve therein. When the cam 11 exerts its action on the pistons, the pressure rises in the piston chambers 22, the common chamber 19 and the piping itself; and if the rise is excessive, the pressure will vent itself through the safety valve.

What I claim as my invention and desire to secure by United States Letters Patent is:—

1. A valve gear comprising a valve, a guide for said valve, a part engaged with the end of the stem of said valve, a plurality of cylinders arranged around the axis of said valve, plungers each mounted to reciprocate in one of said cylinders, said cylinders and plungers being located intermediate said stem-end part and said guide, and means for supplying a pressure fluid to said cylinders to force said plungers against said stem-engaged part so as to hold said valve in closed position.

2. A valve gear comprising a valve, a guide for the stem of said valve, a part engaged with the end of said valve stem, a member embracing said valve guide and stem and providing a number of cylinders around the axis of said valve stem, plungers each mounted to reciprocate in one of said cylinders and engaging said stem-engaged end part, and means for supplying a pressure fluid to said cylinders to force said plungers against said stem-end engaged part so as to hold said valve in closed position.

3. A valve gear comprising a valve, a guide for the stem of said valve, a part engaged with the end of said valve stem, a member embracing said valve guide and stem and providing an open chamber, means for connecting said chamber with a pressure fluid supply, a tubular body encircling said member and closing its chamber, said body providing a number of cylinders opening into said chamber, and hollow plungers each mounted to reciprocate in one of said cylinders and engaging said stem-engaged part, the pressure fluid supplied to said chamber and cylinders acting to force said plungers against said stem-engaged part so as to hold said valve in closed position.

4. A valve gear comprising a valve, a guide for the stem of said valve and having an abutment, a part engaged with the end of said valve stem, a member embracing said valve guide and stem and providing an open chamber, an abutment in said member engaging said valve guide abutment, means for connecting said chamber with a pressure fluid supply, a tubular body encircling said member and closing its chamber, said body providing a number of cylinders opening into said chamber, and hollow plungers each mounted to reciprocate in one of said cylinders and engaging said stem-engaged part, the pressure fluid supplied to said chamber and cylinders acting to force said plungers against said stem-engaged part so as to hold said valve in closed position.

5. A valve gear comprising a valve, a guide for the stem of said valve, an abutment on said valve stem guide, a member having a tubular part embracing said valve stem guide, an abutment on said tubular part engaging said valve stem guide abutment, a flange projecting from said tubular member, a socket connected with said flange and opening into the space confined thereby, a member having a central bore and a circumferential row of bores parallel with the axis of said valve stem guide, said member being located over said tubular part and having its edge engaged with said flange to provide a chamber into which said circumferential bores open, hollow plungers each mounted to reciprocate in one of said circumferential bores, a part connected with the end of said valve stem and lying over said plungers for engagement thereby, valve actuating means acting on said valve stem, and means for supplying a pressure fluid to said chamber and bores to actuate said plungers and valve stem for resiliently holding said valve in closed position.

In testimony whereof I affix my signature.

GUIDO FORNACA.